| United States Patent [19] | [11] | 4,152,753 |
|---|---|---|
| Amann | [45] | May 1, 1979 |

[54] CLEANING SYSTEM FOR AUTO HEADLIGHT

[76] Inventor: Peter M. Amann, Magnusstr. 25, D-8960 Kempten, Fed. Rep. of Germany

[21] Appl. No.: 827,620

[22] Filed: Aug. 24, 1977

[30] Foreign Application Priority Data

Sep. 2, 1976 [DE] Fed. Rep. of Germany ....... 2639521

[51] Int. Cl.$^2$ ............................................. B60Q 1/00
[52] U.S. Cl. ...................................... 362/64; 362/253; 362/311
[58] Field of Search ......................... 362/64, 253, 311

[56] References Cited

U.S. PATENT DOCUMENTS 3,934,301  1/1976  Di Salvo ......................... 362/253 X Primary Examiner—Stephen J. Lechert, Jr.
Attorney, Agent, or Firm—Haseltine, Lake & Waters

[57] ABSTRACT

A cleaning system particularly intended for use on automobile head lamps or tail lamps which system comprises a cylindrical transparent shield which is movably mounted about or in front of the head lamp and a plastic film which can be drawn off from a supply roller and which is guided around and supported by the transparent shield and connected to a winding roller. The shield and the plastic film are continuously or intermittently moved with the same surface speed avoiding any sliding friction between the shield and the film in the contacting area of which, in order to replace a dirty section of the film in the contacting area by an adjacent clean section.

10 Claims, 2 Drawing Figures

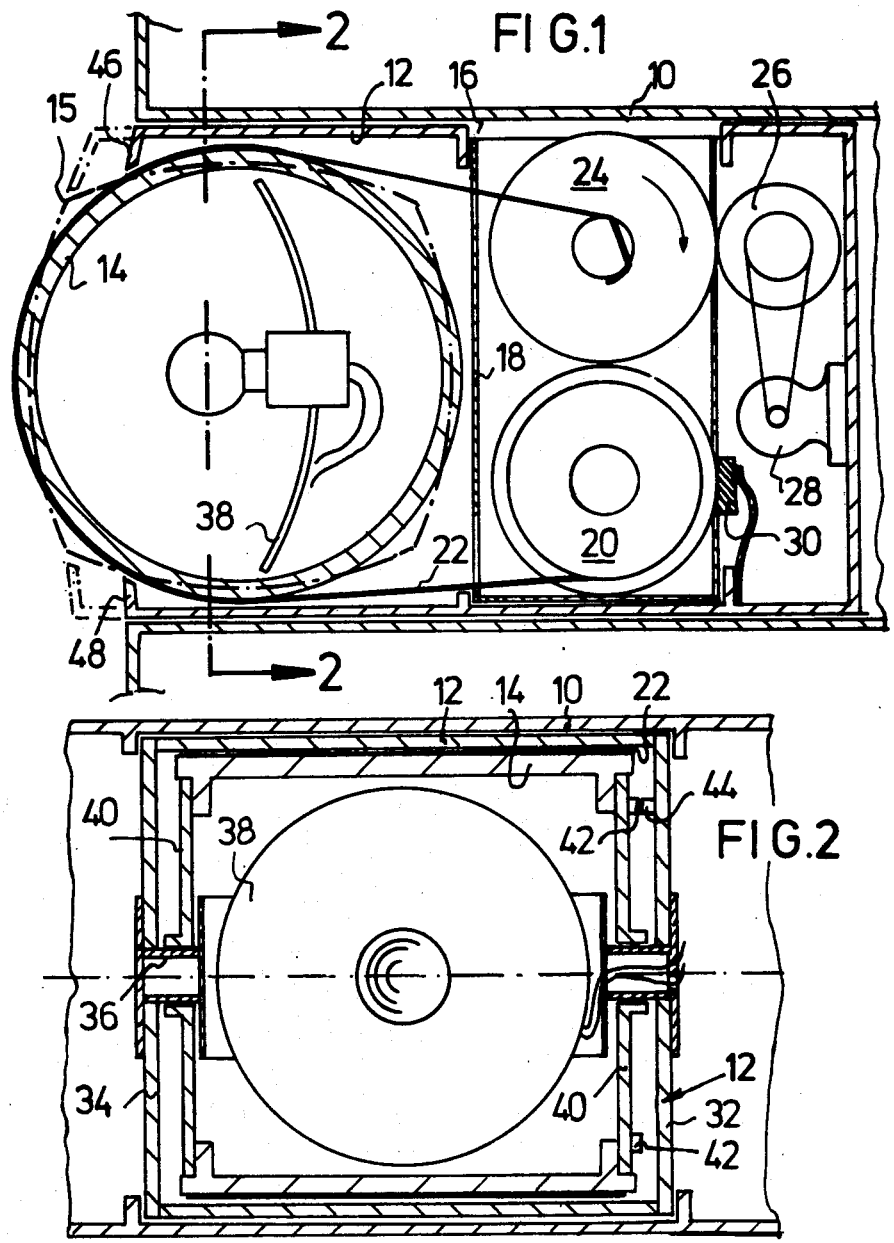

CLEANING SYSTEM FOR AUTO HEADLIGHT

My invention relates to a cleaning system which is particularly intended for use on automobile head lamps or tail lamps.

From the German patent application No. 20 22 155 a device is known which comprises a transparent shield mounted in front of a light source, the transparent shield is protected from dirt accumulation by a transparent plastic film which can be wound off from a supply roller and wound up on a winding roller and which in the running path of the film between the pair of rollers is supported by the transparent shield which forms the front glass of the head lamp. In this known structure the plastic film is guided in close contact with the stationary front glass. High friction forces exist when the film is moved, and the film can break. Besides of that because of the relative wind the film tends to flutter.

From the German patent application No. 21 19 868 another solution of a cleaning system is known according to which a rigid cylindrical transparent shield is used which is rotatably mounted and intermittently moved to replace a dirty area of the cylinder by a clean one. This device requires a cleaning bath, wipers and brushes.

It is, therefore one object of the invention to provide an improved means for preventing head lamps, tail lamps, reflectors etc. from becoming obscured by dirt accumulation which means overcomes the disadvantages of the methods disclosed in the prior art.

Accordingly there is provided a cleaning system for automobile head lamps or the like comprising a transparent shield arranged in front of a light source and/or a reflector and a transparent plastic film wound on a rotatably mounted supply roller and guided in front of the shield and being connected with a rotatably mounted winding roller, the plastic film in the light emission area of the head lamp or the like being supported by the shield, characterized in that the shield is movably arranged for a common movement of the film and the film supporting portion of the shield.

The present invention consists in the combination of a movable transparent supporting shield and a movable transparent plastic films contacting and protecting said shield, whereby during the movement of the shield and the film any relative movement in the contacting area of which is avoided. The film can be moved easier and can be made thinner. It needs a lower break resistance and can be guided in close contact with the movable shield so that no fluttering can occur. The device can be produced with low costs because the movable shield can form the only guide means of the film between the pair of film rollers.

According to one embodiment of the invention the shield consists of a flexible band continuously guided around at least a pair of guide rollers between which the light emission area of the lamp or light reflection area of the reflector is formed. The continuous band can be arranged with oppositely moved band sections in front of the light source or can be arranged around the light source.

According to another embodiment the shield consists of a hollow cylinder rotatably arranged around the light source or reflecting element. This structure gives a good and flutter-free support of the plastic protecting film. The hollow cylinder preferably has a circular cross-section, but it is in the scope of the invention to use a cylinder having a polygonal cross-section or being formed by a plurality of convexed sections.

The present invention is not limited for use on head lamps and tail lamps of automobiles but can be used in connection with any systems of stationary objects exposed to dirt accumulation for example working place lamps, radiation emission devices as laser emitter, reflection systems in which the shield instead of being made from transparent material is formed with a reflecting outer surface.

The following is a description by way of example of one embodiment of the present invention reference being had to the accompanying drawing in which FIG. 1 is a schematic cross-sectional view of an embodiment of the new cleaning system.

FIG. 2 is a cross-sectional view taken along the line 2—2 of FIG. 1.

In a housing 10 provided in a automobile body a prismatical chamber is formed in which a frame 12 is removably inserted. A transparent hollow cylinder 14 of circular cross-section is rotatably supported about a horizontal axis in the front portion of the frame 12. In the middle portion of the frame 12 a chamber 16 open at the upside is provided into which a cassette 18 is removably inserted. Two removable and changeable film rollers 20, 24 are rotatably mounted one above the other and having parallel horizontal rotating axes which are parallel with the rotating axis of the cylinder 14. In the shown embodiment the lower roller is a film supply roller 20 from which a transparent plastic film 22 leaves through a slot in the front wall of the cassette 18. The film then runs around the front half of the hollow cylinder 14 and through a second slot in the front wall of the cassette 18 to a winding roller 24. The spools of both of the rollers 20, 24 are identical and are provided with lateral spool discs. The spool disc of the winding roller 24 is in driving contact with a friction roller 26 drivingly connected with an electric motor 28. The spool disc of the supply roller 20 is in contact with a brake 30 which prevents an uncontrolled winding-off of the film. The motor 28 and the brake 30 are mounted within a rear chamber of the frame 12.

Coaxial hollow axes 36 are fastened in side walls 32, 34 of the frame 12 and a head lamp reflector 38 is mounted at said axes. The hollow cylinder 14 is rotatably mounted on said axes 36 by means of side discs 40 the hubs of which being provided with sealing rings (not shown) so that the hollow cylinder is sealed. Electrical wires of the lamp pass through one of the hollow axes and are connected with the battery in known manner.

Two control projections 42 provided on one of the side discs 40 at diametrically opposed places but on the same diameter operate a switch 44 respectively arranged at the adjacent side wall 32 of the frame 12. The switch 44 opens the electrical circuit of the driving motor 28 for the film feed after each half rotation of the hollow cylinder 14.

The light emission area of the head lamp is limited by upper and lower frame ribs 46, 48 and by circularly shaped side ribs (not shown) arranged with constant distance closely adjacent to the outer circumference of the hollow cylinder 14 and overlapping both of the lateral edges of the film 22. Therefore that portion of the hollow cylinder 14 lying in the light emission area is completely covered by the protecting film 22. Dirt and other contaminations are accumulated on the film surrounding the cylinder 14 in close contact at this light emission area. If a predetermined degree of dirt accumulation is exceeded a switch (not shown) is operated for example by hand in order to start the motor 28 which drives the winding roller 24 in clockwise direction and because of the close contact between the film and the hollow cylinder the latter is rotated with a circumferential speed which is equal with the running speed of the film. The film is drawn off from the supply roller until the hollow cylinder 14 has performed one half revolution. Then the one control projection 42 operates the switch 44 and the motor 28 is de-energized. The dirty portion of the film has been removed from the light emission area and has been replaced by a clean portion of the film.

Because the film 22 is guided substantially friction-free a very thin film can be used so that the supply on the supply roller 20 is sufficient for thousands of feed processes. The brake is operated by a spring the force of which is small enough that just a taut contact of the film at the hollow cylinder is gained. When the supply roller 20 is empty a catch lever (not shown) in the cabin of the automobile is operated in order to unlock the frame 12 so that the frame can be pulled out until the middle chamber is open and the cassette 18 can be lifted out. Then a new cassette is inserted or the empty spool is used as the new winding spool after a new supply roller has been inserted. In the drawn-out position of the frame the film end can easily be guided around the hollow cylinder and connected with the winding roller. The frame 12 is then pushed into the housing 10 again and the system is ready for working.

Some alterations with respect to the described embodiment are possible. The hollow cylinder 14 instead of a circular cross-section can have an other cross-section, especially a polygonal cross-section. In FIG. 1 in dot-and-dash pattern is marked a hollow cylinder 15 consisting of four convexed surface sections. If the cylinder 15 is used the upper and lower frame ribs 46, 48 must be extended to the front side as marked in dot-and-dashes.

As shown in FIG. 2 the film width is substantially equal with the width of the hollow cylinder 14. A modification with respect to the described embodiment consists in that the hollow cylinder is provided with ring flanges at both sides projecting radially outwards with respect to the intermediate film guiding area defined by that ring flanges. By this alteration the film is exactly guided at its edges.

A further alteration within the scope of this invention consists in that the film is perforated or toothed at least at one of its edges and the hollow cylinder is provided with a toothed wheel rim co-operating with the perforated or toothed film edge.

Instead of only starting the operation of the system by hand the operation can be completely performed by hand when the motor 28 is replaced by a simple pivoting lever construction operable from the cabin of the automobile. On the other hand also an automatic operation of the system is possible. In this alteration a photocell is provided within the hollow cylinder or at the outside of which. This photocell is connected with a known electric circuit. If the light intensity received by the photocell falls below a predetermined value because on the film a certain degree of dirt accumulation has been reached an electronic control device of the electric circuit starts the motor 28 automatically as it has been described in my U.S. Pat. No. 3,917,382.

The new cleaning or protecting system cannot only be used in connection with head lamps but for example also with combination lamps at the automobile tail, in which the hollow cylinder 14 is provided with a plurality of light chambers lying one above the other or one beside the other and each having an own lamp. The cylinder or the film can be subdivided into a plurality of areas each corresponding to one of the light chambers and being differently colored, in order to distinguish for exemple stop light, flash light, tail light etc. from one another.

What I claim is:

1. A cleaning system for automobile head lamps or the like, comprising: a transparent shield arranged in front of a light source and a transparent plastic film wound on a rotatably mounted supply roller guided in front of the shield and being connected with a rotatably mounted winding roller, the plastic film in the light emission area of the head lamp or the like being supported by the shield, wherein the shield is movably arranged for a common movement of the film and the film supporting portion of the shield.

2. A cleaning system as claimed in claim 1, wherein: the shield is a hollow cylinder rotatably arranged about its axis and surrounding the light source.

3. A cleaning system as claimed in claim 2, wherein: the rotating axes of the hollow cylinder and of said pair of film rollers are arranged in parallel.

4. A cleaning system as claimed in claim 2, wherein: the hollow cylinder is mounted for free rotation and is driven by the plastic film partly sourrounding said cylinder when the winding roller is rotated.

5. A cleaning system as claimed in claims 2, wherein: the hollow cylinder has a circular cross-section.

6. A cleaning system as claimed in claims 1, wherein: the movable shield and the pair of film rollers are mounted in a common frame which is removably arranged in a housing.

7. A cleaning system as claimed in claim 1, wherein: said pair of film rollers is arranged within a removable cassette.

8. A cleaning system as claimed in claim 1, wherein: said pair of film rollers is arranged at that side of the shield which is opposed to the light emission area of the head lamps.

9. A cleaning system as claimed in claims 1, wherein: the plastic film is perforated at least along one of its edges and a toothed wheel rim is provided on the hollow cylinder co-operating with the perforated film edge.

10. A cleaning system as claimed in claim 1, wherein: said transparent shield is arranged in front of a reflector.

* * * * *